Aug. 2, 1966  J. G. MACMILLAN  3,263,580
SAFETY ADAPTOR FOR MANHOLES
Filed May 26, 1964

INVENTOR
James G. MacMillan

BY

ATTORNEYS

United States Patent Office 3,263,580
Patented August 2, 1966

3,263,580
SAFETY ADAPTOR FOR MANHOLES
James G. MacMillan, 250 Bayard Ave., Dover, Del.
Filed May 26, 1964, Ser. No. 370,313
5 Claims. (Cl. 94—34)

This invention relates to manhole covers and more particularly to a safety cover therefor.

The principal objects of my invention are to provide a female fitting of the manhole cover normally supported upon blocks built-up from the bottom of the manhole so that the top of the female fitting is slightly lower than but parallel with the surrounding paved or other roadway surface; and a laminated male cover for the female fitting including a lower metallic lamination supported upon an internal annular flange within the upper portion of the female fitting, the metallic lamination having on its upper exposed face a non-metallic lamination preferably of hard rubber or the like which is bolted or otherwise secured to the metallic lamination by epoxy resin or the like, the upper surface of the metallic lamination of the cover being corrugated or roughened if desired, and the peripheral edges of the non-metallic lamination of the cover extending over the upper peripheral edge of the female fitting whereby the upper surface of the non-metallic lamination of the cover will lie flush with the finished surface of the roadway; and a non-metallic retainer surrounding the upper portion of the female fitting and preferably formed of hard rubber or the like, the retainer being of L-shaped cross-section and having its vertical leg disposed closely adjacent to the outer periphery of the female fitting with the upper end lying in the plane of the finished roadway while its horizontal leg is embedded in the material of the roadway, the retainer preventing deterioration of the material of the roadway in the immediate area surrounding the manhole cover.

The present-day manhole installations on highways, streets, airfield runways, ramps, aprons, and taxiways are all designed and made from cast iron stock consisting of a bell or female fitting with a male cover approximately 24″ in diameter and of one inch thickness. The bell or female part of the assembly is anchored flush with the existing pavement. The male part of the assembly, the so-called cover, is placed inside the female assembly giving a completely covered manhole. During the course of time, heavy traffic loads and temperature fluctuations change these installations making them become extremely dangerous and noisy. On many occasions the frost heaving and settling causes the unstable surrounding area or sub-base to settle leaving the manhole cover or bell exposed above the original pavement. This situation, especially during a snow removal program, is extremely dangerous to equipment operators, and all types of snow removal equipment, such as plows, graders, loaders, or the like. This type of equipment travels normally between 5 to 25 miles per hour and when an engagement with the exposed portions of the manhole is made by the blades an extensive amount of damage is done. The result is broken frames, blades and steering mechanisms, not to mention the safety hazards which operators have to contend with. The maintenance and repair costs of this equipment to government, state, county and cities is tremendous, approximating hundreds of thousands of dollars yearly.

I have designed and provided a safety adaptor to obviate such exposed manhole installations and to obviate the above mentioned hazardous conditions, while at the same time improving riding qualities, and muffling the ever-present sounds which result from loose covers. Also, I have provided an adaptor which will practically eliminate the cost of raising manhole installations while a resurfacing program is in progress, the cost of which raising operation is very substantial per manhole.

My adaptor cannot only be used for manhole installations, but also for all metal installations such as electric, water, telephone, gas, etc., which are normally embedded in roadways, airfields, streets, or the like.

I will explain the invention with reference to the accompanying drawing which illustrates one practical embodiment thereof, to enable others familiar with the art to adopt and use the same, and will summarize in the claims the novel features of construction, and novel combinations of parts, for which protection is desired.

Figure 1:
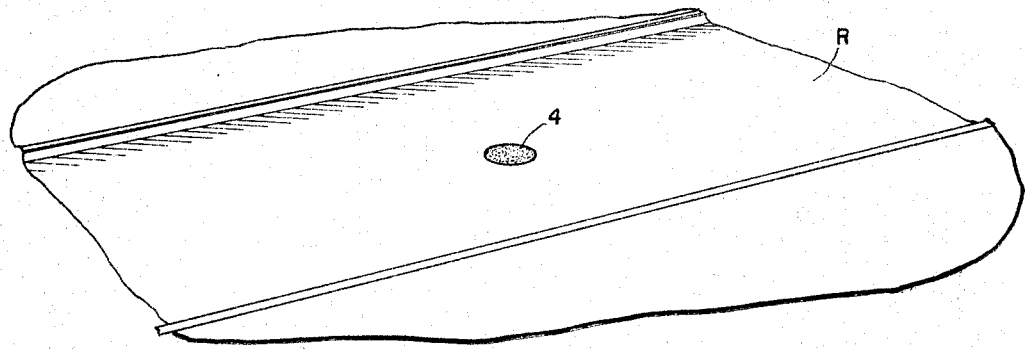
FIG. 1 is a perspective view of a street or roadway showing my novel manhole cover positioned therein flush with the exposed surface of the roadway.

As shown in FIG. 1, the roadway or street R has exposed therein the upper surface of the manhole cover which lies flush in the plane of the roadway or street R, the street being either asphaltic or formed of concrete or other material in the usual manner.

Figure 3:
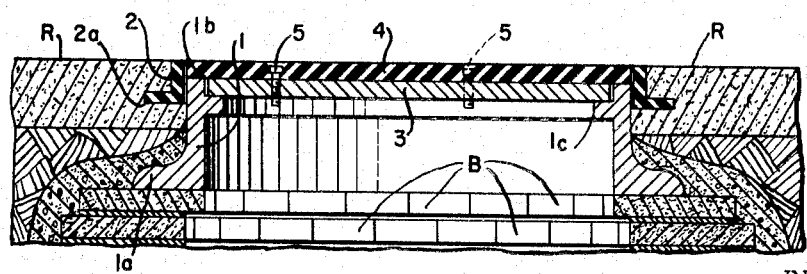
FIG. 3 is a transverse section on the line 3—3, FIG. 2.

As shown in FIG. 3, the female fitting 1 may be of usual circular or annular shape and is substantially L-shaped in cross-section, the lower horizontal leg 1a seating upon the uppermost layer of blocks or bricks B which are built up around the walls of the manhole in the usual manner to such height that the upper rim 1b of the female fitting 1 lies somewhat lower than the upper finished surface of the roadway R, as shown in FIG. 3, for the purpose hereinafter described. No novelty is claimed for the manner in which the female fitting 1 is supported upon the blocks B, the manner illustrated being conventional.

As shown, the roadway R extends substantially to the periphery of the outer wall of the female fitting 1, but according to my invention I provide an annular hard rubber or other non-metallic retainer 2 of L-shaped cross-section around the upper periphery of the female fitting 1, the horizontal leg 2a of which retainer 2 is embedded in the material of the roadway R so as to become substantially fixed therein, while the inner face of the vertical leg of the retainer 2 lies substantially flush around the upper portion of the female fitting 1 and terminates flush with the surface of roadway R.

The female fitting 1 is provided with an internal annular flange 1c, FIG. 3, which supports the male manhole cover which is of laminated form, the same consisting of a circular metallic lamination 3 of slightly less diameter than the diameter of the female fitting 1 and of thickness equal to the distance from the top 1b of fitting 1 to the annular flange 1c so that the lamination 3 lies below the level of the roadway R.

Upon the top of the metallic lamination 3 is a non-metallic lamination 4 of thickness equal to the distance between the surface of the roadway R and the top of the metallic lamination 3, the periphery of the rubber cover 4 extending over the upper rim 1b of female fitting 1 and terminating closely adjacent the inner wall of the retainer 2 as shown in FIG. 3.

Figure 2:
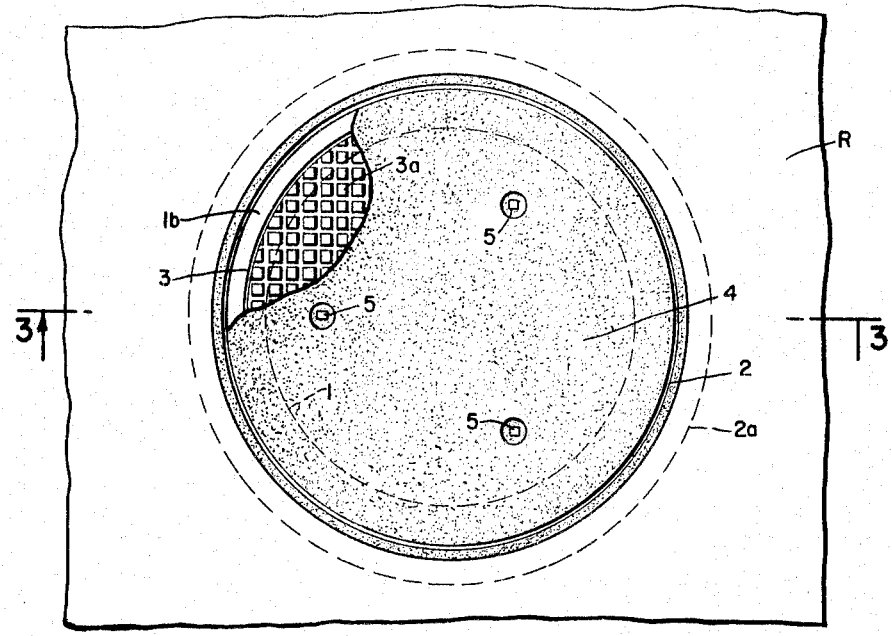
FIG. 2 is an enlarged plan view of my novel manhole cover exposed on the surface of the roadway, a portion thereof being broken away to show the underlying parts.

Preferably the rubber lamination 4 is secured to the metallic lamination 3 by countersunk shearbolts 5 whose threaded ends engage threaded bores in the metallic laminations 3, as shown in FIGS. 2 and 3, or if desired, the rubber lamination 4 may be secured to the metallic plate 3 by epoxy resin or other suitable adhesive or cement, and as shown in FIG. 2, if desired, the upper surface of the metallic lamination may be roughened or corrugated as at 3a.

By the above invention the male member of the manhole cover 3–4 may be adjusted to a position flush with the surface of the roadway R so as to prevent interference with snow removal equipment whose blades must necessarily travel over the covers; also the use of the hard rubber retainer 2 and cover lamination 4 greatly reduces noise, such as rattling or chattering of the cover on the female fitting due to traffic passing thereover. The use of the hard rubber retainer 2 maintains the road surface adjacent the manhole stable during all types of weather and prevents chipping away of the roadway R adjacent the manhole cover due to frost heaving and settling, and thereby prevents the cover of the manhole from becoming exposed above the original pavement. My arrangement therefore causes the surrounding roadway area adjacent the manhole to be stable and prevents exposure of the cover above the original pavement, and therefore improves the riding qualities of the roadway and also muffles the ever-present sounds originating from loose manhole covers.

Moreover, my invention practically eliminates the cost of raising manhole installations during a resurfacing program, the cost of which raising operation is very substantial per manhole.

My adaptor may be used not only for manhole installations, but also for all metal installations such as electric, water, telephone, gas, etc., that are embedded in roadways, airfields, streets, sideways, or the like.

I do not limit my invention to the exact form shown in the drawing for obviously changes may be made therein within the scope of the claims.

I claim:

1. A manhole cover for manholes in roadway or the like comprising a female fitting frame adapted to be supported within the manhole with its upper rim disposed slightly below the surface of the roadway; an inner peripheral flange within the frame disposed slightly below the upper rim thereof; a laminated cover comprising a lower metallic lamination seating upon said flange flush with the upper rim of the frame, and an upper non-metallic lamination secured to the lower lamination and extending over said upper rim and having its upper face adapted to be disposed flush with the surface of the roadway; and a non-metallic retainer adapted to be embedded in the roadway and surrounding the upper portion of the frame and disposed closely adjacent the outer periphery of the frame and with its upper end disposed in the plane of the upper face of said non-metallic lamination.

2. In a manhole cover as set forth in claim 1, said non-metallic members being of hard rubber.

3. A manhole cover for manholes in roadway or the like comprising a female fitting frame adapted to be supported within the manhole with its upper rim disposed slightly below the surface of the roadway; an inner peripheral flange within the frame disposed slightly below the upper rim thereof; a laminated cover comprising a lower metallic lamination seating upon said flange flush with the upper rim of the frame, and an upper non-metallic lamination secured to the lower lamination and extending over said upper rim and having its upper face adapted to be disposed flush with the surface of the roadway; and a non-metallic retainer of L-shaped cross-section surrounding the upper portion of the frame and having its vertical leg disposed closely adjacent the outer periphery of the frame and with its upper end disposed in the plane of the upper face of said non-metallic lamination, and its horizontal leg adapted to be embedded in the roadway.

4. In a manhole cover as set forth in claim 3, said non-metallic members being of hard rubber.

5. In a manhole cover as set forth in claim 3, said non-metallic lamination being secured to the metallic lamination by epoxy resin.

References Cited by the Examiner
UNITED STATES PATENTS

| | | | |
|---|---|---|---|
| 2,314,682 | 3/1943 | Becket | 94—34 |
| 2,619,828 | 12/1952 | Wiesmann | 52—221 |
| 2,735,166 | 2/1956 | Hoseason | 52—221 |
| 3,074,208 | 1/1963 | Seidel | 52—221 |
| 3,131,512 | 5/1964 | MacLeod | 52—221 |

JACOB L. NACKENOFF, *Primary Examiner.*